(12) United States Patent
Kim et al.

(10) Patent No.: US 9,100,172 B2
(45) Date of Patent: Aug. 4, 2015

(54) METHOD FOR INTERWORKING WITH TRUSTZONE BETWEEN NORMAL DOMAIN AND SECURE DOMAIN, AND MANAGEMENT METHOD OF TRUSTED APPLICATION DOWNLOAD, MANAGEMENT SERVER, DEVICE AND SYSTEM USING IT

(75) Inventors: Do Wan Kim, Gyeonggi-do (KR); Hyun Wook Kim, Gyeonggi-do (KR); Jung Keum Shin, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 0 days.

(21) Appl. No.: 13/807,877

(22) PCT Filed: Apr. 16, 2012

(86) PCT No.: PCT/KR2012/002860
§ 371 (c)(1),
(2), (4) Date: Jan. 2, 2013

(87) PCT Pub. No.: WO2013/065915
PCT Pub. Date: May 10, 2013

(65) Prior Publication Data
US 2014/0245013 A1 Aug. 28, 2014

(30) Foreign Application Priority Data
Nov. 4, 2011 (KR) .................. 10-2011-0114305
Nov. 16, 2011 (KR) .................. 10-2011-0119557
Nov. 16, 2011 (KR) .................. 10-2011-0119558

(51) Int. Cl.
H04L 29/08 (2006.01)
H04L 9/08 (2006.01)
H04L 29/06 (2006.01)

(52) U.S. Cl.
CPC .......... *H04L 9/0838* (2013.01); *H04L 63/0884* (2013.01); *H04L 63/10* (2013.01); *H04L 67/125* (2013.01); *H04L 67/34* (2013.01)

(58) Field of Classification Search
CPC ..... H04L 67/34; H04L 67/125; H04L 67/025; G06F 9/445
USPC ...................... 713/164, 171; 726/1
See application file for complete search history.

(56) References Cited

U.S. PATENT DOCUMENTS 6,175,924 B1 * 1/2001 Arnold .......................... 713/189
6,889,212 B1 * 5/2005 Wang et al. .................... 705/59

(Continued)

FOREIGN PATENT DOCUMENTS

JP 1999024919 1/1999
JP 2005117277 A 4/2005

(Continued)

OTHER PUBLICATIONS

Ongtang, M.; McLaughlin, S.; Enck, W.; McDaniel, P., "Semantically Rich Application-Centric Security in Android," Dec. 7-11, 2009, Computer Security Applications Conference, 2009. ACSAC '09. Annual, pp. 340,349.*

(Continued)

*Primary Examiner* — Eleni Shiferaw
*Assistant Examiner* — Nelson Giddins
(74) *Attorney, Agent, or Firm* — Lowe Hauptman & Ham, LLP

(57) ABSTRACT

The present invention provides a trusted application download management, authentication, and execution method and system. A trusted application download management server according to the present invention includes a service loader, which accesses a device equipped with a trusted platform and establishes a data communication channel, and a service controller which controls the delegation of a download authority for a trusted application and allows the trusted application to be downloaded to the device when a trusted application download is requested by the device, thus totally managing the download of the trusted applications and allowing the trusted application to be securely downloaded.

9 Claims, 14 Drawing Sheets

(56) References Cited

U.S. PATENT DOCUMENTS

| | | | |
|---|---|---|---|
| 7,257,707 B2* | 8/2007 | England et al. | 713/164 |
| 7,752,658 B2 | 7/2010 | Jirka et al. | |
| 7,930,537 B2* | 4/2011 | Paatero | 713/165 |
| 8,131,997 B2* | 3/2012 | Chang et al. | 713/159 |
| 8,307,203 B2* | 11/2012 | Fraleigh et al. | 713/156 |
| 8,560,823 B1* | 10/2013 | Aytek et al. | 713/2 |
| 2006/0093149 A1* | 5/2006 | Zhu et al. | 380/277 |
| 2006/0129848 A1* | 6/2006 | Paksoy et al. | 713/193 |
| 2008/0005790 A1* | 1/2008 | Jirka et al. | 726/11 |
| 2008/0005794 A1* | 1/2008 | Inoue et al. | 726/22 |
| 2008/0098212 A1* | 4/2008 | Helms et al. | 713/155 |
| 2009/0055918 A1* | 2/2009 | Chang et al. | 726/22 |
| 2009/0119541 A1* | 5/2009 | Inoue et al. | 714/10 |
| 2009/0132828 A1* | 5/2009 | Kiester et al. | 713/185 |
| 2009/0187980 A1* | 7/2009 | Tung | 726/6 |
| 2010/0195833 A1* | 8/2010 | Priestley et al. | 380/273 |
| 2010/0250946 A1* | 9/2010 | Korte et al. | 713/175 |
| 2010/0292556 A1* | 11/2010 | Golden | 600/364 |
| 2012/0064828 A1* | 3/2012 | Khan et al. | 455/41.1 |
| 2012/0331550 A1* | 12/2012 | Raj et al. | 726/22 |
| 2013/0091557 A1* | 4/2013 | Gurrapu | 726/5 |
| 2013/0097698 A1* | 4/2013 | Taveau et al. | 726/19 |
| 2013/0219173 A1* | 8/2013 | Ho et al. | 713/157 |
| 2014/0006803 A1* | 1/2014 | Bodis et al. | 713/189 |
| 2014/0007192 A1* | 1/2014 | Qureshi et al. | 726/3 |
| 2014/0237260 A1* | 8/2014 | Priestley et al. | 713/189 |

FOREIGN PATENT DOCUMENTS

| | | |
|---|---|---|
| JP | 2005124097 A | 5/2005 |
| JP | 2006217320 A | 8/2006 |
| JP | 2006277289 A | 10/2006 |
| JP | 2008269220 A | 11/2008 |
| KR | 1020070108723 | 11/2007 |

OTHER PUBLICATIONS

Schiffman, J.; Xinwen Zhang; Gibbs, S., "DAuth: Fine-Grained Authorization Delegation for Distributed Web Application Consumers," Jul. 21-23, 2010, Policies for Distributed Systems and Networks (Policy), 2010 IEEE International Symposium, pp. 95,102.*

Ryutaro Toji, The advanced technology and usage trends of IC card, Journal of Business Communication, Oct. 25, 2013, pp. 2-11, vol. 38 No. 11.

Eikazu N, Hideki A, Junko H, Smart Card Information Sharing Platform NINA, Oct. 25, 2013, pp. 25-32, Tokyo, Japan.

Japanese Office Action for application No. 2013-541934 dated Oct. 18, 2013, citing the above reference(s).

International Search Report mailed Sep. 25, 2012 for PCT/KR2012/002860, citing the above references.

* cited by examiner

FIG. 5

| Index | ApName | IP | Port | Delingate | OTHERS |
|---|---|---|---|---|---|
| 0 | Root AP | 192.168.50.10 | 2000 | Yes | |
| 1 | SKT | | | Yes | |
| 2 | SOLACIA | | | Yes | |
| 3 | CONTELA | | | Yes | |
| 4 | WOORI BANK | 192.158.50.11 | 2000 | NO | |

METHOD FOR INTERWORKING WITH TRUSTZONE BETWEEN NORMAL DOMAIN AND SECURE DOMAIN, AND MANAGEMENT METHOD OF TRUSTED APPLICATION DOWNLOAD, MANAGEMENT SERVER, DEVICE AND SYSTEM USING IT

TECHNICAL FIELD

The present invention relates to a trusted application download management method, and a trusted application download management server, a device, and a management system using the same, and more particularly, to a trusted application download management method, and a trusted application download management server, a device, and a management system using the same, which manage the download of a trusted application and the delegation of a download authority for the trusted application, directly download the trusted application, or provide storage location information of the trusted application.

Moreover, the present invention relates to a method for interworking between a secure domain and a normal domain and a recording medium recording the same, and more particularly, to a method for interworking between a secure domain and a normal domain and a recording medium recording the same, which process some procedures during execution of a normal application installed in the normal domain by interworking with a trusted application installed in the secure domain.

Furthermore, the present invention relates to a key management system and method for an update of a route public key, and more particularly, to a key management system and method for an update of a route public key, which manages a route public key used to download or install a trusted application when the route public key is updated by a device for encrypting a certificate and a device for decrypting the certificate.

BACKGROUND ART

Recently, the use of high-performance mobile devices such as smart phones has increased significantly. The smart phone is a mobile communication device that provides various functions such as program operation, data communication, interworking with a personal computer (PC), etc. and provides advanced functions like a PC. The smart phone provides a standardized interface and platform for an application program developer, and a user other than a mobile device manufacturer or a mobile communication service provider can freely install various application programs that the user wants and can develop and provide application programs to be installed in the smart phones.

Moreover, with the increased use of the smart phones, application stores where various application programs used in the smart phones are available as applications have emerged, and thus the users can download desired applications to their smart phones through the application stores.

These smart phones are provided with open platforms and various network connection environments and thus face more security threats such as information leakage, charge occurrence, device failure, etc. through malicious code infection, hacking, etc. than existing mobile phones.

The development of security technologies currently used in the smart phones has been focused primarily on software-based vaccine programs or network traffic control technologies. However, in the case of the smart phones, the risk that user information may be easily exposed through hardware control is very high, and thus it is impossible to provide sufficient security with conventional security technologies.

In particular, a technique for ensuring the reliability of a device (hardware) from jailbreaking or rooting and a technique for preventing malicious code from running with respect to the open platform of the smart phone, a technique for verifying the security of applications with respect to the distribution of mobile applications, a technique for encrypting data stored in the device to prevent information leakage and a technique for remotely controlling a lost device with respect to data protection, a technique for secure payment and secure storage of payment information to achieve a secure electronic payment service with respect to the electronic financial transaction, etc. are required.

TrustZone technology is a security technology used in a system that runs on an open operating system (OS), in which one central processing unit (CPU) is physically divided into a normal domain and a secure domain.

Moreover, the secure domain runs on a secure operating system, and an application that requires security runs in the secure domain. The normal domain runs on an open operating system such as Android, Windows Phone 7, etc., and an application that does not require security runs in the normal domain.

For the application of the TrustZone technology, a trusted application should be securely installed in the secure domain and, in particular, a method for securely downloading the trusted application to the secure domain in a device equipped with a platform employing the TrustZone technology or equipped with a trusted platform is required.

Furthermore, in the device equipped with the platform employing the TrustZone technology or equipped with the trusted platform, the secure domain and the normal domain run on different operating systems, and a memory space storing data is divided. Thus, the access to the data that requires security is totally blocked, but it is necessary for some execution procedures, such as payment, of a normal application installed in the normal domain to be processed by a trusted application installed in the secure domain. Accordingly, the interworking between the trusted application installed in the secure domain and the normal application installed in the normal domain is required.

In addition, the device equipped with the trusted platform running in the divided secure domain and normal domain requires various security standards for security enhancement or standards for a key management method in the secure domain. The secure domain may be divided into a root protection domain, a protection domain, and a domain assigned to each application, and a key may be assigned to each domain to perform an authentication procedure, thus executing the installed application.

However, the key assigned to each of these domains of the device is a public key received from a trusted application providing server or a management server and, when the received public key is updated, a public key stored in the trusted application providing server or the management server does not match a public key stored in the device, which makes it impossible to perform the authentication.

DISCLOSURE

Technical Problem

Accordingly, the present invention has been made in an effort to solve the above-described problems associated with prior art, and an object of the present invention is to provide a trusted application download management method, and a trusted application download management server, a device, and a management system using the same, which manage the download of a trusted application and the delegation of a download authority for the trusted application, directly download the trusted application, or provide storage location information of the trusted application.

Another object of the present invention is to provide a method for interworking between a secure domain and a normal domain and a recording medium recording the same, which process some procedures during execution of a normal application installed in the normal domain by interworking with a trusted application installed in the secure domain.

Still object of the present invention is to provide a key management system and method for an update of a route public key, which manages a route public key used to download or install a trusted application when the route public key is updated by a device for encrypting a certificate and a device for decrypting the certificate.

Technical Solution

In order to achieve the above objects, according to one aspect of the present invention, there is provide a trusted application download management server comprising: a service loader which accesses a device equipped with a trusted platform and establishes a data communication channel; and a service controller which controls the delegation of a download authority for a trusted application and allows the trusted application to be downloaded to the device when a trusted application download is requested by the device.

According to another aspect of the present invention, there is provided a device equipped with a trusted platform, the device comprising a management agent which establishes a data communication channel with a trusted application download management server, transmits a trusted application download request message including an identification name of a trusted application to the trusted application download management server through the communication channel, downloads the trusted application from the trusted application download management server, and installs the trusted application in a secure domain.

According to still another aspect of the present invention, there is provided a trusted application download management system, the system comprising: a device equipped with a trusted platform which establishes a data communication channel, transmits a trusted application download request message including an identification name of a trusted application through the communication channel, downloads the trusted application, and installs the trusted application in a secure domain; and a trusted application download management server which manages the delegation of a download authority for the trusted application and allows the trusted application to be downloaded to the device through the communication channel when a trusted application download request message is received.

According to yet another aspect of the present invention, there is provided a trusted application download management method comprising the steps of: assigning, at a trusted application download management server, an identification name to a trusted application and registering the identification name, the delegation of a download authority for the trusted application, and storage location information of the trusted application in a management list; establishing a communication channel between a device equipped with a trusted platform and the trusted application download management server; receiving a trusted application download request message including an identification name of the trusted application from the device; and determining, at the trusted application download management server, whether the download authority for the requested trusted application corresponding to the identification name of the trusted application is delegated, downloading the trusted application directly to the device when the download authority is delegated, and transmitting the storage location information of the trusted application to the device when the download authority is not delegated.

According to still yet another aspect of the present invention, there is provided a trusted application download management method comprising the steps of: receiving, at a trusted application download management server, the delegation of a download authority for a trusted application from a trusted application providing server and downloading the trusted application; assigning an identification name to a trusted application to which the download authority is delegated and a trusted application to which the download authority is not delegated, and registering the identification name, the delegation of the download authority, and storage location information of the trusted application in a management list; and receiving and storing update information from the trusted application providing server when the trusted application registered in the management list is updated.

According to a further aspect of the present invention, there is provided a recording medium recording a trusted application download management method as a program and readable by an electronic device, wherein the trusted application download management method comprises the steps of: assigning an identification name to a trusted application and registering the identification name, the delegation of a download authority for the trusted application, and storage location information of the trusted application in a management list; and determining whether the download authority for the trusted application corresponding to the identification name of the trusted application is delegated when a trusted application download request message including the identification name of the trusted application is received, directly downloading the trusted application when the download authority is delegated, and transmitting the storage location information of the trusted application when the download authority is not delegated.

According to another further aspect of the present invention, there is provided a method for interworking between a secure domain and a normal domain, the method comprising the steps of: requesting, at a device equipped with a trusted platform, a normal application from an application providing server; searching, at the application providing server, whether the requested normal application is required to interwork with a trusted application; determining whether a trusted application capable of interworking with the normal application is installed in the device when the normal application is required to interwork with the trusted application; issuing, at the application providing server, a certificate by matching an authority to invoke the trusted application installed in the device with the normal application when the trusted application is installed in the device and packaging the issued certificate and the normal application; and providing, at the application providing server, the packaged certificate and normal application to the device when the trusted application is installed in the device.

According to still another further aspect of the present invention, there is provided a method for interworking between a secure domain and a normal domain, the method comprising the steps of: requesting, at a device equipped with a trusted platform, a normal application from an application providing server; searching, at the application providing server, whether the requested normal application is required to interwork with a trusted application; determining whether a trusted application capable of interworking with the normal application is installed in the device when the normal application is required to interwork with the trusted application; issuing, at the application providing server, a certificate by matching an authority to invoke the trusted application capable of interworking with the normal application with the normal application when the trusted application is not installed in the device and packaging the issued certificate and the normal application; and providing, at the application providing server, the packaged certificate and normal application and the trusted application capable of interworking with the normal application to the device when the trusted application is not installed in the device.

According to yet another further aspect of the present invention, there is provided a recording medium recording a method for interworking between a secure domain and a normal domain as a program and readable by an electronic device, wherein the method for interworking between the secure domain and the normal domain comprises the steps: requesting, at a device equipped with a trusted platform, a normal application from an application providing server; searching, at the application providing server, whether the requested normal application is required to interwork with a trusted application; determining whether a trusted application capable of interworking with the normal application is installed in the device when the normal application is required to interwork with the trusted application; issuing, at the application providing server, a certificate by matching an authority to invoke the trusted application installed in the device with the normal application when the trusted application is installed in the device and packaging the issued certificate and the normal application; and providing, at the application providing server, the packaged certificate and normal application to the device when the trusted application is installed in the device.

According to still yet another further aspect of the present invention, there is provided a recording medium recording a method for interworking between a secure domain and a normal domain as a program and readable by an electronic device, wherein the method for interworking between the secure domain and the normal domain comprises the steps of: requesting, at a device equipped with a trusted platform, a normal application from an application providing server; searching, at the application providing server, whether the requested normal application is required to interwork with a trusted application; determining whether a trusted application capable of interworking with the normal application is installed in the device when the normal application is required to interwork with the trusted application; issuing, at the application providing server, a certificate by matching the authority to invoke the trusted application capable of interworking with the normal application with the normal application when the trusted application is not installed in the device and packaging the issued certificate and the normal application; and providing, at the application providing server, the packaged certificate and normal application and the trusted application capable of interworking with the normal application to the device when the trusted application is not installed in the device.

According to a still further aspect of the present invention, there is provided an application providing server comprising: an application characteristic search unit which searches whether a normal application is required to interwork with a trusted application during execution of the normal application when a normal application request message is received from a device equipped with a trusted platform; a certificate issuance unit which issues a certificate by matching an authority to invoke the trusted application with the normal application; an application storage unit which packages and stores the issued certificate and the normal application and stores the trusted application required for interworking with the normal application together with the packaged certificate and normal application; and a transmission/reception unit which receives the normal application request message from the device and provides the packaged certificate and normal application or the trusted application to the device.

According to a yet further aspect of the present invention, there is provided a trusted application download management server comprising: a route public key management unit which generates a first route public key and a second route public key, manages update information of the first route public key and the second route public key and updated route public keys, and generates a second certificate by encrypting the second route public key; and a service loader which accesses a device equipped with a trusted platform and a trusted application providing server to establish a data communication channel and, when a trusted application, to which a first certificate is added, is received from the trusted application providing server, further adds the second certificate to the trusted application, and transmits them to the device.

According to a still yet further aspect of the present invention, there is provided a device equipped with a trusted platform, the device comprising: a route public key management unit which stores a first route public key and a second route public key received from a trusted application download management server, inquires of the trusted application download management server about the update of the first route public key or the second route public key, and receives and stores update information and an updated route public key; and an authentication processing unit which performs authentication for installation of a trusted application using the first route public key and the second route public key.

According to an additional aspect of the present invention, there is provided a key management system for an update of a route public key, the key management system comprising: a trusted application download management server which generates a first route public key and a second route public key, manages update information of the first route public key and the second route public key and updated route public keys, generates a second certificate by encrypting the second route public key when a trusted application, to which a first certificate is added, is received, further adds the second certificate to the trusted application, and transmits them to the device; a trusted application providing server which receives the first route public key, the update information, and the updated route public key from the trusted application download management server, generates the first certificate by encrypting the first route public key, adds the first certificate to the trusted application, and transmits them; and a device equipped with a trusted platform, which receives the first route public key and the second route public key from the trusted application download management server and performs authentication for installation of the trusted application.

According to a still additional aspect of the present invention, there is provided a key management method for an update of a route public key, the key management method comprising the steps of: generating, at a trusted application providing server, a first certificate by encrypting a first route public key received from a trusted application download management server, adding the first certificate to a trusted application, and transmitting them to the trusted application download management server; generating, at the trusted application download management server, a second certificate by encrypting a second route public key, further adding the second certificate to the trusted application, and transmitting them to a device equipped with a trusted platform; and performing, at the device, an authentication procedure using the first route public key and the second route public key received from the trusted application download management server.

Advantageous Effects

According to the present invention, the trusted application download management server can receive the delegation of the download authority from the trusted application providing server, can download the trusted application directly to the device, and can totally manage the trusted applications.

Moreover, even when the trusted application download management server does not receive the delegation of the download authority from the trusted application providing server, the trusted application download management server can generate the certificate when the trusted application is downloaded to the device, thus allowing the trusted application to be securely downloaded.

Furthermore, the certificate having the authority to invoke the trusted application is provided together with the normal application, and thus the procedures of the secure domain required during the execution of the application installed in the normal domain can be executed by invoking the trusted application installed in the secure domain in the device equipped with the trusted platform comprising the secure domain and the normal domain which are physically divided.

In addition, when the normal application is provided, the characteristics of the normal application is searched to determine the trusted application required for interworking with the normal application and it is determined whether the corresponding trusted application is installed in the device. As a result, when the corresponding trusted application is not installed in the device, the trusted application can be provided together with the normal application, and thus it is possible to simplify the procedure.

Additionally, the trusted application download management server can totally manage the route public keys, and thus it is possible to solve the problem of the mismatch of the public keys between the trusted application providing server and the device and between the trusted application download management server and the device.

Also, the device can inquire of the trusted application download management server about the occurrence of the update of the route public key and, when the route update key is updated, receive the update information and the updated route public key, thus easily obtaining the update information of the route public key.

DESCRIPTION OF DRAWINGS

FIG. 5 is a diagram showing an embodiment of a management list stored in a management list storage unit of the trusted application download management server according to the present invention.

MODE FOR INVENTION

Figure 1:
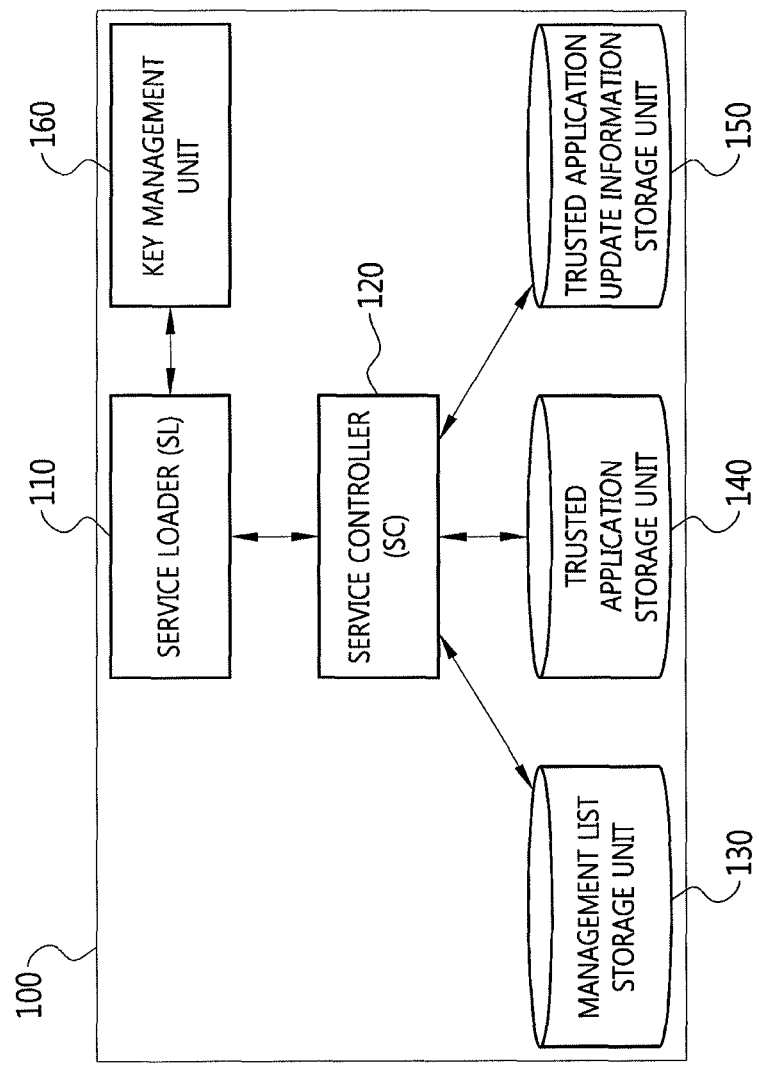
FIG. 1 is a configuration diagram showing an embodiment of a trusted application download management server in accordance with one aspect of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

Embodiments of a trusted application download management method, and a trusted application download management server, a device, and a management system using the same, embodiments of a method for interworking between a secure domain and a normal domain and a recording medium recording the same, an application providing server employing a method for interworking between a secure domain and a normal domain, and a device equipped with a trusted platform, and embodiments of a key management system and method for an update of a route public key will be described in detail with reference to the attached drawings. In the following description with reference to the attached drawings, the same or similar components are denoted by the same reference numerals, and a repetitive description thereof will be omitted.

Trusted Application Download Management Server

FIG. 1 is a configuration diagram showing an embodiment of a trusted application download management server in accordance with one aspect of the present invention.

According to this embodiment, as shown in FIG. 1, a trusted application download management server 100 may comprise a service loader (SL) 110, a service controller (SC) 120, a management list storage unit 130, a trusted application storage unit 140, a trusted application update information storage unit 150, and a key management unit 160.

The service loader 110 accesses a device equipped with a trusted platform (TP) and establishes a data communication channel. The service loader 110 establishes the data communication channel to an access point of the trusted application download management server 100 in conjunction with a management agent of the device.

The service controller 120 controls the delegation of a download authority for a trusted application and, when a trusted application download is requested by the device, allows the trusted application to be downloaded to the device.

The management list storage unit 130 assigns an identification name to the trusted application, connects the identification name, the delegation of the download authority for the trusted application, and storage location information of the trusted application, and stores them in a trusted application management list.

FIG. 5 is a diagram showing an embodiment of a management list stored in a management list storage unit of the trusted application download management server according to the present invention.

As shown in FIG. 5, an embodiment of a management list comprises an identification name (ApName) of a trusted application, storage location information (IP) of the trusted application, and delegation (Delegate) of a download authority for the trusted application.

The identification name (ApName) of the trusted application may be a name of a trusted application providing server or a trusted application provider.

The storage location information (IP) of the trusted application may be an IP address of the trusted application storage unit when the download authority for the trusted application is delegated or an IP address of the trusted application providing server when the download authority for the trusted application is not delegated.

The trusted application storage unit 140 may download and store the trusted application from the trusted application providing server when the download authority for the trusted application is delegated to the trusted application download management server 100.

The delegation of the download authority for the trusted application to the trusted application download management server 100 may be performed by the trusted application provider or the trusted application providing server. The trusted application download management server 100 with the delegated download authority downloads the trusted application from the trusted application providing server and stores the trusted application in the trusted application storage unit 140 and, when a trusted application download is requested by the device, downloads the trusted application directly to the device.

When receiving a trusted application download request message including the identification name (ApName) of the trusted application from the device, the service controller 120 searches the management list (refer to FIG. 5) and determines whether the download authority for the trusted application corresponding to the identification name is delegated. The service controller 120 may download the trusted application directly to the device when the download authority is delegated and transmit the storage location information of the trusted application to the device when the download authority is not delegated.

The trusted application update information storage unit 150 stores update information of the trusted application and, when the trusted application stored in the trusted application management list is updated or when information on trusted application updated is received, stores the update information.

When the trusted application update information is stored in the trusted application update information storage unit 150, a trusted application update message including location information of the trusted application update information storage unit 150 may be transmitted to the device.

The service loader 110 is connected to the key management unit 160. When the trusted application is provided to the device, the key management unit 160 generates a route public key, generates a route certificate using the route public key, and transmits the certificate to the device, thus allowing the device to perform an authentication procedure when the trusted application is downloaded and installed.

The key management unit 160 may generate a route public key and provide the route public key to the device when the trusted application with the delegated download authority, stored in the trusted application storage unit 140, is downloaded by the trusted application download management server as well as when the trusted application without the delegated download authority is provided to the device through the service loader 110.

Thus, the device can receive both a certificate provided by the trusted application providing server and a certificate provided by the trusted application download management server and perform the authentication procedure, and thus the trusted application can be securely provided to the device.

Device Equipped with Trusted Platform

Figure 2:
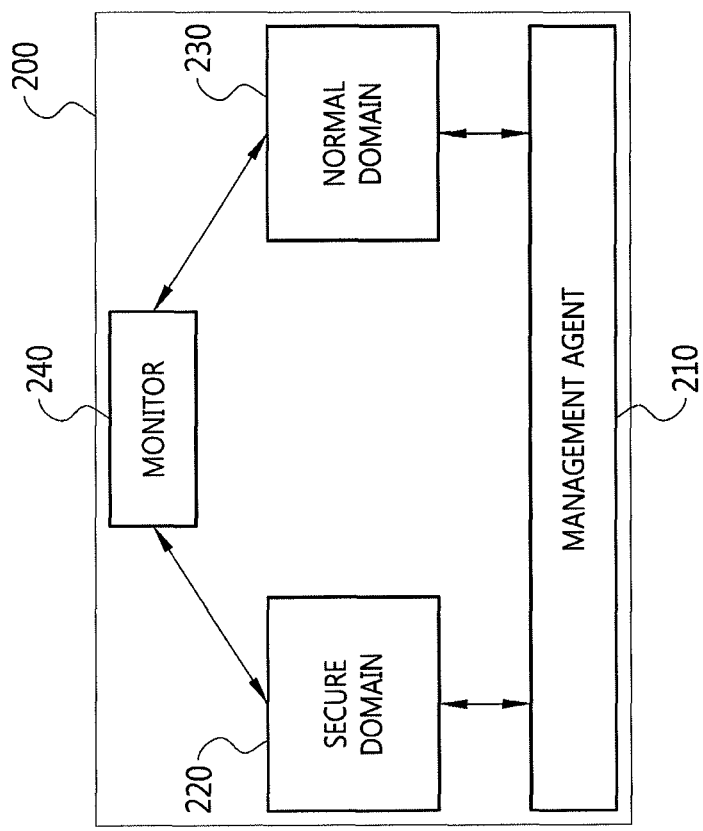
FIG. 2 is a configuration diagram showing an embodiment of a device equipped with a trusted platform in accordance with another aspect of the present invention.

FIG. 2 is a configuration diagram showing an embodiment of a device equipped with a trusted platform in accordance with another aspect of the present invention.

According to this embodiment, as shown in FIG. 2, a device 200 equipped with a trusted platform (TP) is a device in which a secure domain and a normal domain are physically divided and thus an operating system in the normal domain and an operation system in the secure domain run in different manners.

The device 200 equipped with the trusted platform comprises a management agent 210, a secure domain 220, a normal domain 230, and a monitor 240.

The management agent 210 establishes a data communication channel with a trusted application download management server 100, transmits a trusted application download request message including an identification name of a trusted application to the trusted application download management server 100 through the communication channel, downloads the trusted application from the trusted application download management server 100, and installs the downloaded trusted application in the secure domain.

The management agent 210 serves as an access point between the device and the trusted application from the trusted application download management server 100 and functions to install the trusted application in the secure domain when the trusted application is requested and downloaded.

Trusted Application Download Management System

Figure 3:
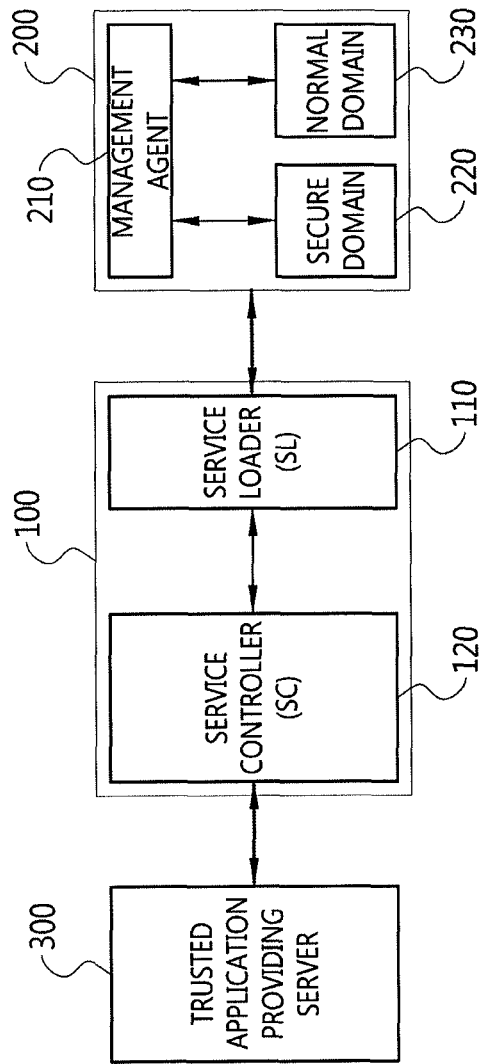
FIG. 3 is a configuration diagram showing an embodiment of a trusted application download management system in accordance with still another aspect of the present invention.

FIG. 3 is a configuration diagram showing an embodiment of a trusted application download management system in accordance with still another aspect of the present invention.

According to this embodiment, as shown in FIG. 3, a trusted application download management system comprises a trusted application download management server 100, a device 200 equipped with a trusted platform, and a trusted application providing server 300.

The trusted application download management server 100 manages the delegation of a download authority for a trusted application and, when a trusted application download is requested by the device 200, allows the trusted application to be downloaded to the device 200.

The trusted application download management server 100 may comprise a service loader (SL) 110 which accesses the device 200 equipped with a trusted platform (TP) and establishes a data communication channel and a service controller (SC) 120 which controls the delegation of a download authority for a trusted application and, when a trusted application download is requested by the device 200, allows the trusted application to be downloaded to the device 200.

The trusted application download management server 100 may further comprise a management list storage unit 130 which assigns an identification name to the trusted application, connects the identification name, the delegation of the download authority for the trusted application, and storage location information of the trusted application, and stores them in a trusted application management list.

Moreover, the trusted application download management server 100 may further comprise a trusted application storage unit 140 which downloads and stores the trusted application from a trusted application provider or a trusted application providing server when the download authority for the trusted application is delegated.

The device 200 equipped with the trusted platform comprises a management agent 210 which establishes a data communication channel and performs the overall function of processing the download of the trusted application such as transmitting a trusted application download request message including an identification name of a trusted application, downloading the trusted application, and installing the downloaded trusted application in a secure domain.

The configurations of the trusted application download management server 100 and the device 200 equipped with the trusted platform 200 have been described above in detail with reference to FIGS. 1 and 2, and thus detailed descriptions thereof will be omitted.

The trusted application providing server 300 gathers trusted applications from a plurality of application supply servers (suppliers), manages the gathered trusted applications in a single server, and performs the functions of managing the trusted applications such as uploading the trusted application to the server or downloading the trusted application stored in the server.

Figure 4:
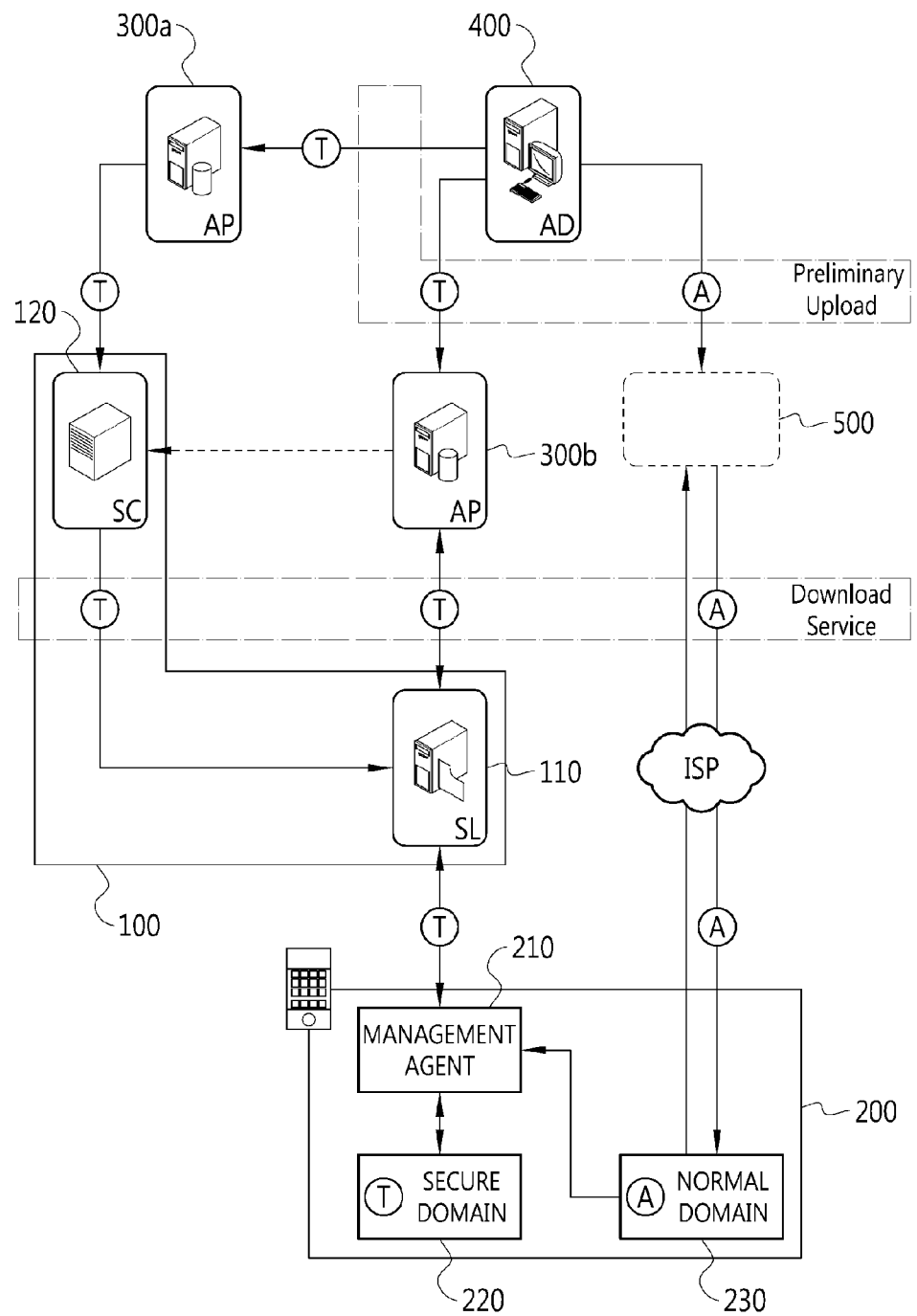
FIG. 4 is a configuration diagram showing another embodiment of a trusted application download management system in accordance with still yet another aspect of the present invention.

FIG. 4 is a configuration diagram showing another embodiment of a trusted application download management system in accordance with still yet another aspect of the present invention.

According to this embodiment, a trusted application download management system comprises a trusted application download management server 100, a device 200 equipped with a trusted platform, a plurality of trusted application providing servers 300a and 300b, an application development server 400, and a normal application providing server 500.

In the device 200 equipped with the trusted platform, a secure domain and a normal domain are divided such that a trusted application is stored in the secure domain and a normal application is stored in the normal domain.

Accordingly, a server or server area which manages the download of the trusted application and the normal application should be divided, and thus the trusted application download management system according to this embodiment is divided into the trusted application download management server 100 and the normal application providing server 500.

The path for downloading or uploading the trusted application to the trusted application download management server 100 is shown as "T", and the path for downloading or uploading the normal application to the normal application providing server 500 is shown as "A" in FIG. 4.

Trusted Application Download Management Method

Figure 6:
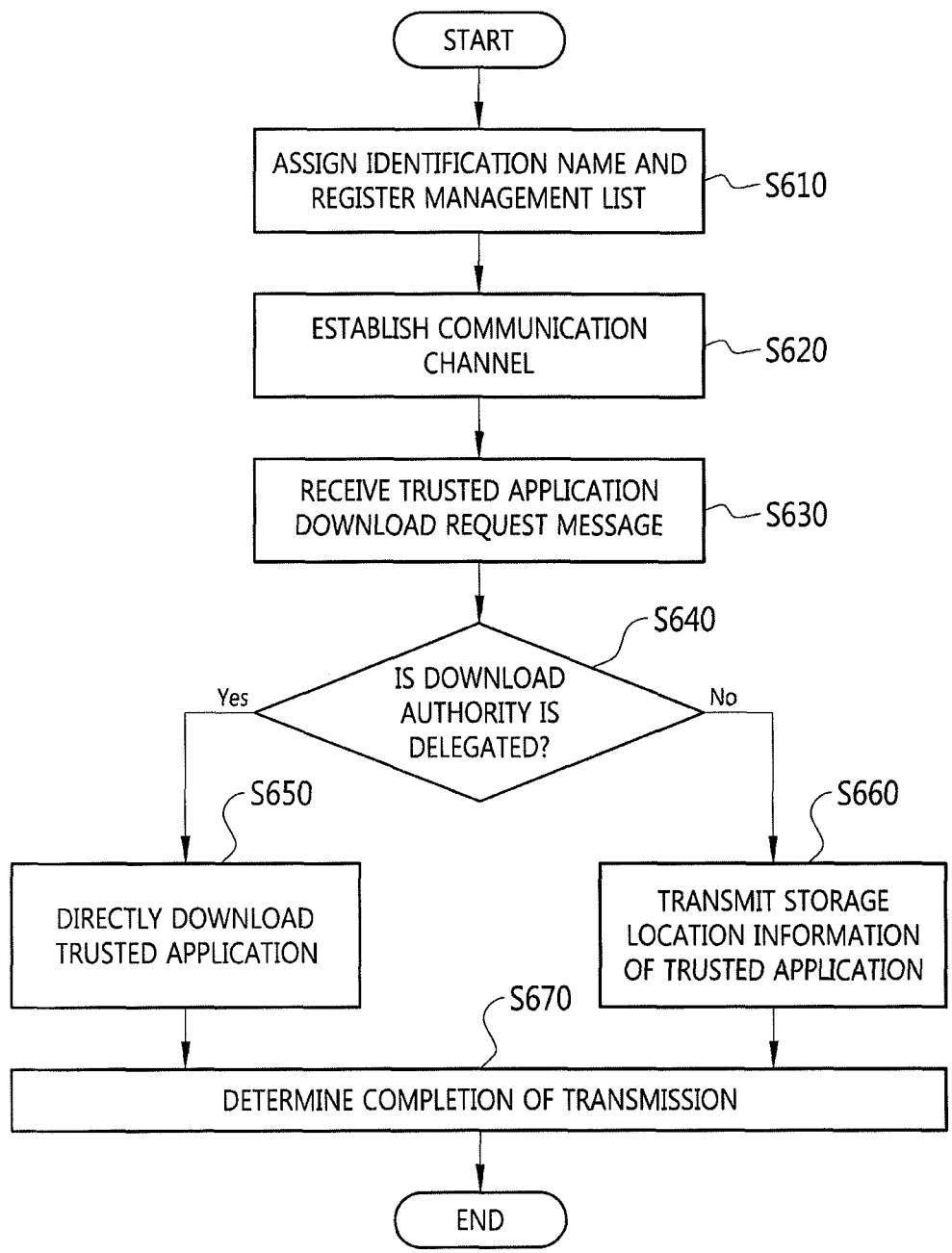
FIG. 6 is a flowchart showing an embodiment of a trusted application download management method in accordance with a further aspect of the present invention.

FIG. 6 is a flowchart showing an embodiment of a trusted application download management method in accordance with a further aspect of the present invention.

According to this embodiment, as shown in FIG. 6, a trusted application download management server registers a management list (S610) and establishes a communication channel between the trusted application download management server and a device (S620).

The registration (S610) of the management list by the trusted application download management server is performed by assigning an identification name to a trusted application and listing the identification name, the delegation of a download authority for the trusted application, and storage location information of the trusted application.

When a trusted application download request message is received from the device (S630), the trusted application download management server determines whether the download authority for the requested trusted application is delegated (S640).

As a result of the determination, the trusted application is downloaded directly from the trusted application download management server when the download authority is delegated (S650), and the trusted application download management server transmits storage location information of the trusted application to the device when the download authority is not delegated (S660).

When the data communication between the trusted application download management server and the device is completed, it is determined whether the transmission is completed, and the data communication channel is terminated.

When the data communication between the trusted application download management server and the device is completed, the determination of the completion of the transmission (S670) may be performed by inquiring of the device whether the download of the trusted application or the transmission of the storage location information of the trusted application is completed and receiving a transmission completion message from the device.

When receiving the update information of the trusted application whose identification name is registered in the management list, the trusted application download management server stores the update information and transmits the storage location information of the update information to the device.

Figure 7:
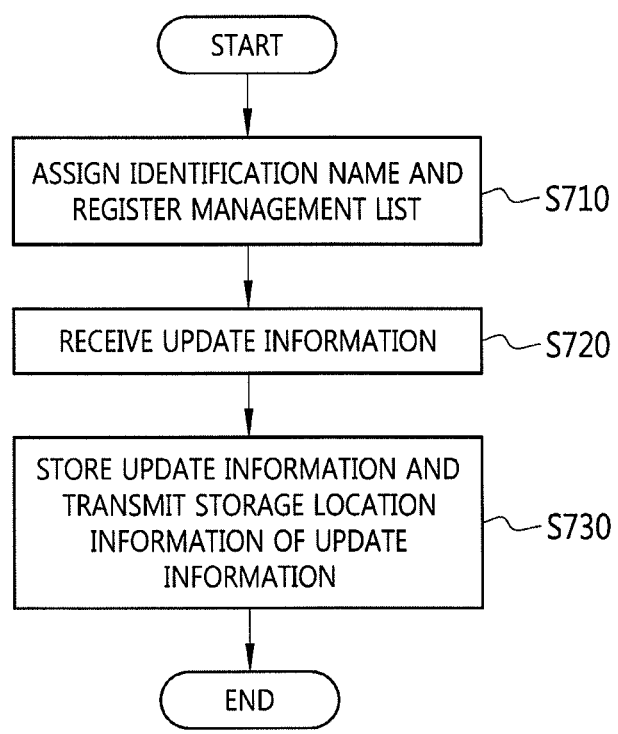
FIG. 7 is a flowchart showing a trusted application download management method when a trusted application is updated in accordance with another further aspect of the present invention.

FIG. 7 is a flowchart showing a trusted application download management method when a trusted application is updated in accordance with another further aspect of the present invention.

First, according to this embodiment, the trusted application download management server receives the delegation of a download authority for a trusted application from a trusted application providing server and downloads and stores the trusted application.

Then, as shown in FIG. 7, the trusted application download management server assigns an identification name to a trusted application to which the download authority is delegated from the trusted application providing server and a trusted application to which the download authority is not delegated, and registers the identification name, the delegation of the download authority, and storage location information of the trusted application in the management list (S710).

When the trusted application registered in the management list is updated, update information is received from the trusted application providing server and stored (S720), and storage location information of the update information is transmitted to the device (S730).

In the step of storing the update information and transmitting the storage location information of the update information to the device (S730), when a communication channel between the device and the trusted application download management server is established and a trusted application download request message including an identification name of a trusted application is received from the device, the trusted application download management server determines whether the download authority for the trusted application corresponding to the identification name of the transmitted trusted application is delegated, downloads the trusted application directly to the device when it is determined that the download authority is delegated, and transmits the storage location information of the trusted application to the device when it is determined that the download authority is not delegated.

Recording Medium Recording Trusted Application Download Management Method as Program and Readable by Electronic Device According to still another aspect of the present invention, a recording medium recording a trusted application download management method as a program and readable by an electronic device may be provided, the trusted application download management method comprising the steps of assigning an identification name to a trusted application and registering the identification name, the delegation of a download authority for the trusted application, and storage location information of the trusted application in a management list, and when a trusted application download request message including the identification name of the trusted application is received, determining whether the download authority for the trusted application corresponding to the identification name of the trusted application is delegated, directly downloading the trusted application when the download authority is delegated, and transmitting the storage location information of the trusted application when the download authority is not delegated.

The trusted application download management method can be written as a program, and the codes and code segments that constitute the program can be easily construed by programmers skilled in the art to which the present invention pertains.

Moreover, the program of the trusted application download management method can be stored in an electronic device-readable medium and read and executed by the electronic device. Thus, the program of the trusted application download management method can receive the delegation of the download authority for the trusted application and perform or relay the download of the trusted application to the device.

Accordingly, the trusted application download management server can receive the delegation of the download authority for the trusted application, can totally manage the trusted applications, and can provide a certified transmission path between the trusted application providing server and the device when the download authority is not delegated.

Application Providing Server

Figure 8:
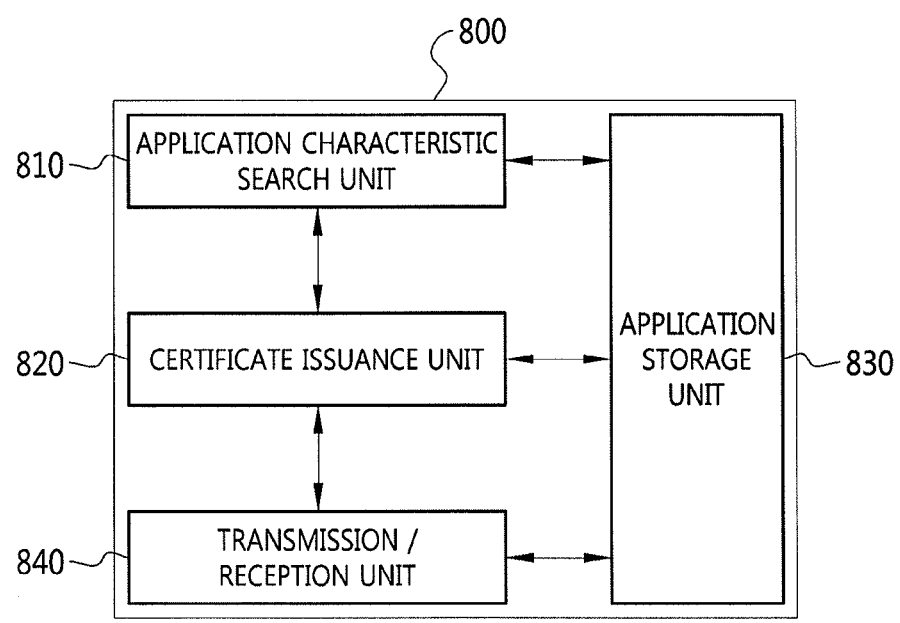
FIG. 8 is a configuration diagram showing an embodiment of an application providing server in accordance with still another further aspect of the present invention.

FIG. 8 is a configuration diagram showing an embodiment of an application providing server in accordance with still another further aspect of the present invention.

According to this embodiment, as shown in FIG. 8, an application providing server 800 employing a method for interworking between a secure domain and a normal domain may comprise an application characteristic search unit 810, a certificate issuance unit 820, an application storage unit 830, and a transmission/reception unit 840.

When receiving a normal application request message from a device 200 equipped with a trusted platform, the application characteristic search unit 810 searches whether the normal application is required to interwork with a trusted application when the normal application is executed.

As shown in FIG. 2, the device 200 equipped with the trusted platform comprises the secure domain 220 and the normal domain 230, which are physically divided. An operating system of the secure domain runs in the secure domain and an operating system of the normal domain runs in the normal domain.

The execution process of the trusted application stored in the secure domain is displayed on the monitor 240 as the operating system of the secure domain runs, and the final execution result is stored again in a memory of the secure domain.

In general, the operating system of the normal domain in the device equipped with the trusted platform cannot access the secure domain, and its memory is separated from that of the secure domain. As a result, it is impossible to invoke the trusted application for the authentication procedure, data encryption and decryption, etc. during the execution of the normal application stored in the normal domain, which is problematic.

In the present invention, to solve the above-described problem, the application characteristic search unit 810 searches for the characteristics of the normal application in advance to search whether the normal application is required to interwork with the trusted application during the execution of the normal application, and the certificate issuance unit 820 issues a certificate by matching an authority to invoke the trusted application with the normal application.

Moreover, the application storage unit 830 may package and store the issued certificate and the normal application and may store and manage the trusted application required for interworking with the normal application together with the packaged certificate and normal application.

Accordingly, when receiving the normal application request message from the device 200, the transmission/reception unit 840 of the application providing server 800 provides the packaged certificate and normal application or the trusted application to the device 200.

That is, the certificate is issued by matching the authority to invoke the trusted application with the normal application, the certificate and the normal application are packaged and provided to the device, and thus it is possible to interwork with the trusted application stored in the secure domain using the certificate stored in the normal domain in the device equipped with the trusted platform, in which the secure domain and the normal domain are physically divided.

A detailed process of interworking between the trusted application and the normal application using the certificate will be described in more detail with reference to FIGS. 10 and 11.

Method for Interworking Between Secure Domain and Normal Domain

Figure 9:
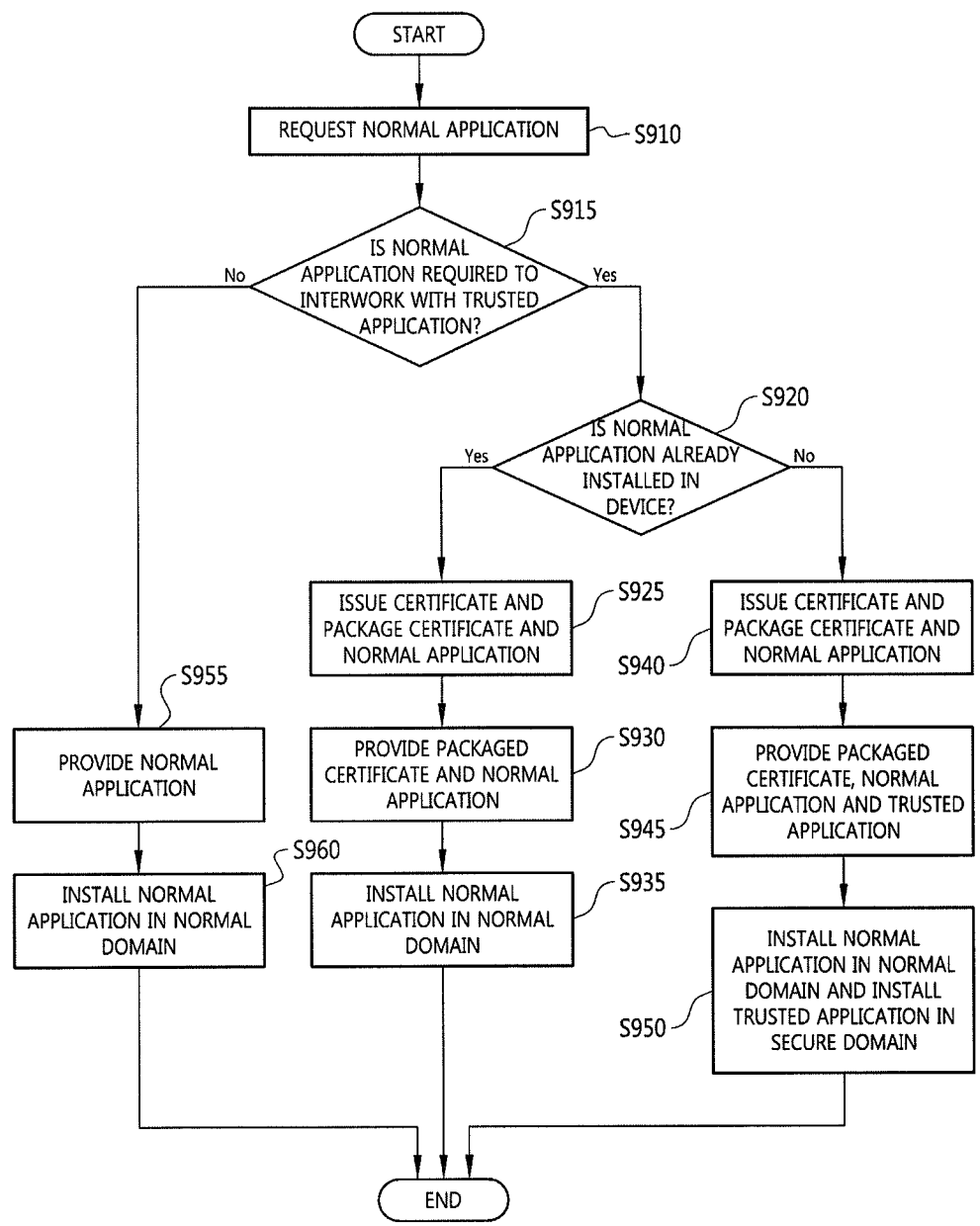
FIG. 9 is a flowchart showing an embodiment of a method for interworking between a secure domain and a normal domain in accordance with yet another further aspect of the present invention.
Figure 10:
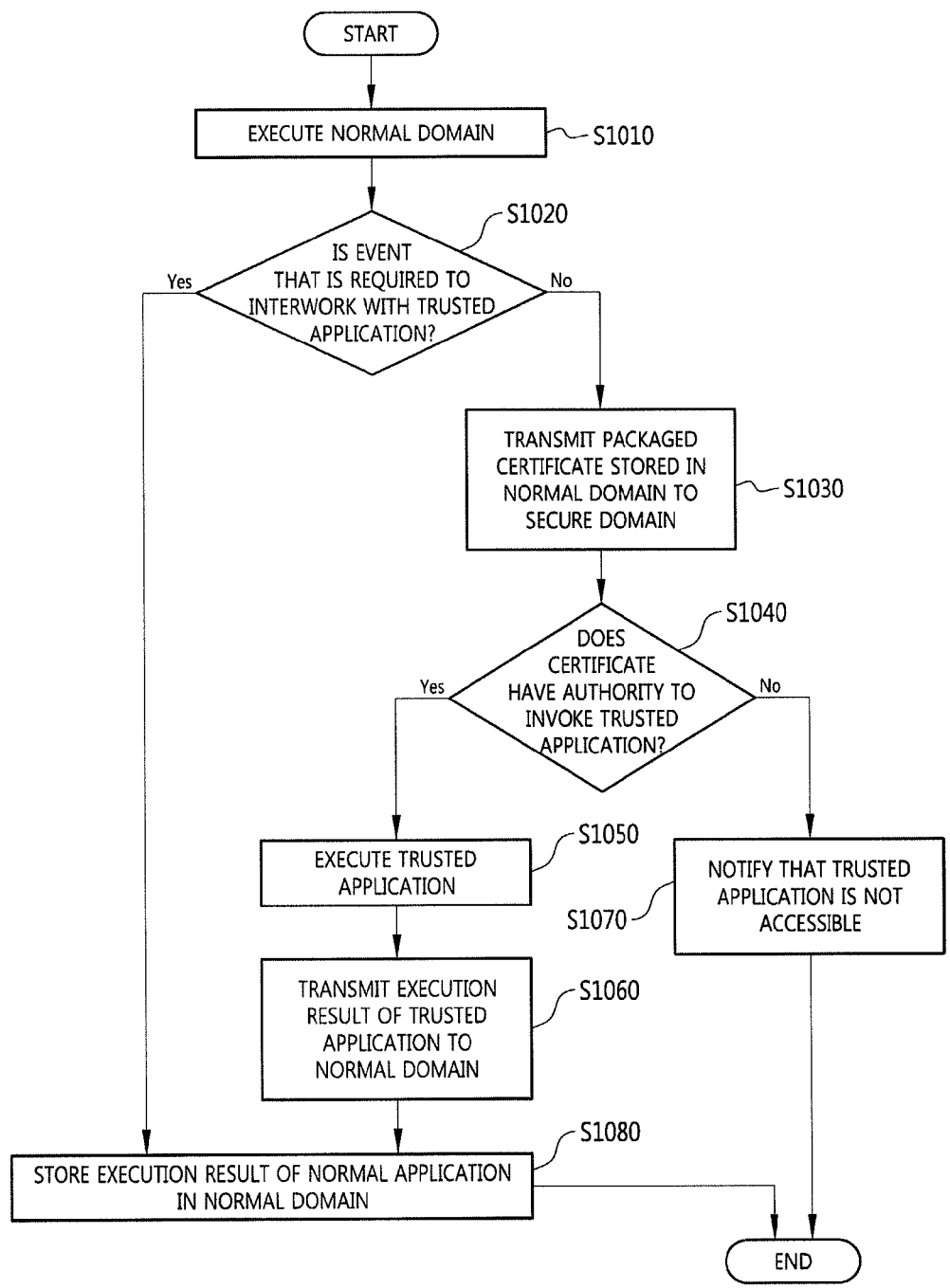
FIG. 10 is a flowchart showing another embodiment of a method for interworking between a secure domain and a normal domain in accordance with still yet another further aspect of the present invention.

FIG. 9 is a flowchart showing an embodiment of a method for interworking between a secure domain and a normal domain in accordance with yet another further aspect of the present invention, and FIG. 10 is a flowchart showing another embodiment of a method for interworking between a secure domain and a normal domain in accordance with still yet another further aspect of the present invention.

According to an embodiment of the present invention, as shown in FIG. 9, in a method for interworking between a secure domain and a normal domain, when a normal application is requested by a device equipped with a trusted platform (S910), an application providing server searches whether the normal application is required to interwork with a trusted application (S915).

When the normal application is not required to interwork with the trusted application (No), the application providing server provides the normal application to the device (S955) and stores and installs the normal application in the normal domain (S960).

When the normal application is required to interwork with the trusted application (Yes), the application providing server determines whether a trusted application required for interworking with the normal application is already installed in the device (S920).

As a result of the determination in step S920, when the trusted application required for interworking with the normal application is already installed in the device (Yes), the application providing server issues a certificate for the execution of the normal application, packages the certificate and the normal application (S925), and provides the packaged certificate and normal application to the device (S930).

The certificate and the normal application provided to the device are stored in the normal domain, and the normal application is installed in the normal domain (S935).

As a result of the determination in step S920, when the trusted application required for interworking with the normal application is not installed in the device (No), the application providing server issues a certificate by matching an authority to invoke the trusted application with the normal application required during the execution of the normal application, packages the certificate and the normal application (S940), and provides the packaged certificate and normal application and the trusted application required for interworking with the normal application to the device (S945).

The certificate and the normal application provided to the device are stored in the normal domain, and the trusted application is stored in the secure domain (S950).

According to another embodiment of the present invention, as shown in FIG. 10, in a method for interworking between a secure domain and a normal domain, a normal application installed in a normal domain of a device is executed (S1010), and during the execution of the normal application, it is determined whether some procedures are required to interwork with a trusted application (S1020) and, when the interworking is required, the trusted application is invoked to process the following procedures.

As a result of the determination in step S1020, when it is determined that an event that requires the execution of the trusted application does not occur during the execution of the normal application (No), the normal application is executed, and the execution result is stored in a memory of the normal domain (S1080), and then the execution of the normal application is terminated.

As a result of the determination in step S1020, when it is determined that the event that requires the execution of the trusted application occurs during the execution of the normal application (Yes), a packaged certificate stored in the normal domain is transmitted to the secure domain (S1030).

An operating system of the secure domain verifies the received certificate and determines whether the certificate has the authority to invoke the trusted application (S1040).

As a result of the determination in step S1040, when it is determined that the certificate has the authority to invoke the trusted application (Yes), i.e., when the certificate is verified, the trusted application is executed (S1050).

The execution result of the trusted application in the secure domain is transmitted again to the normal domain (S1060), and thus the following procedures of the normal application are processed. The final execution result of the normal application is stored in the memory of the normal domain (S1080), and then the execution of the normal application is terminated.

As a result of the determination in step S1040, when it is determined that the certificate does not have the authority to invoke the trusted application (No), i.e., when the verification of the certificate fails, the operating system of the normal domain is notified that the trusted application is not accessible (S1070), and thus the following procedures of the normal application are not executed but terminated based on the f.

For example, when a payment is requested during the execution of the normal application (i.e., when an event that is required to interwork with the trusted application occurs), the operating system of the normal domain transmits a packaged certificate and a payment request message together with the normal application to the secure domain. The operating system of the secure domain verifies the received certificate and, when the certificate is verified, invokes the trusted application that the certificate has the authority to invoke, processes the payment procedures, and transmits the payment result to the normal domain. The operating system of the normal domain, which receives a payment success message as the payment result, executes the following procedures of the normal application such as guidance for delivery procedures, etc., and the operating system of the normal domain, which receives a payment failure message as the payment result, notifies that the transaction is unavailable.

Figure 11:
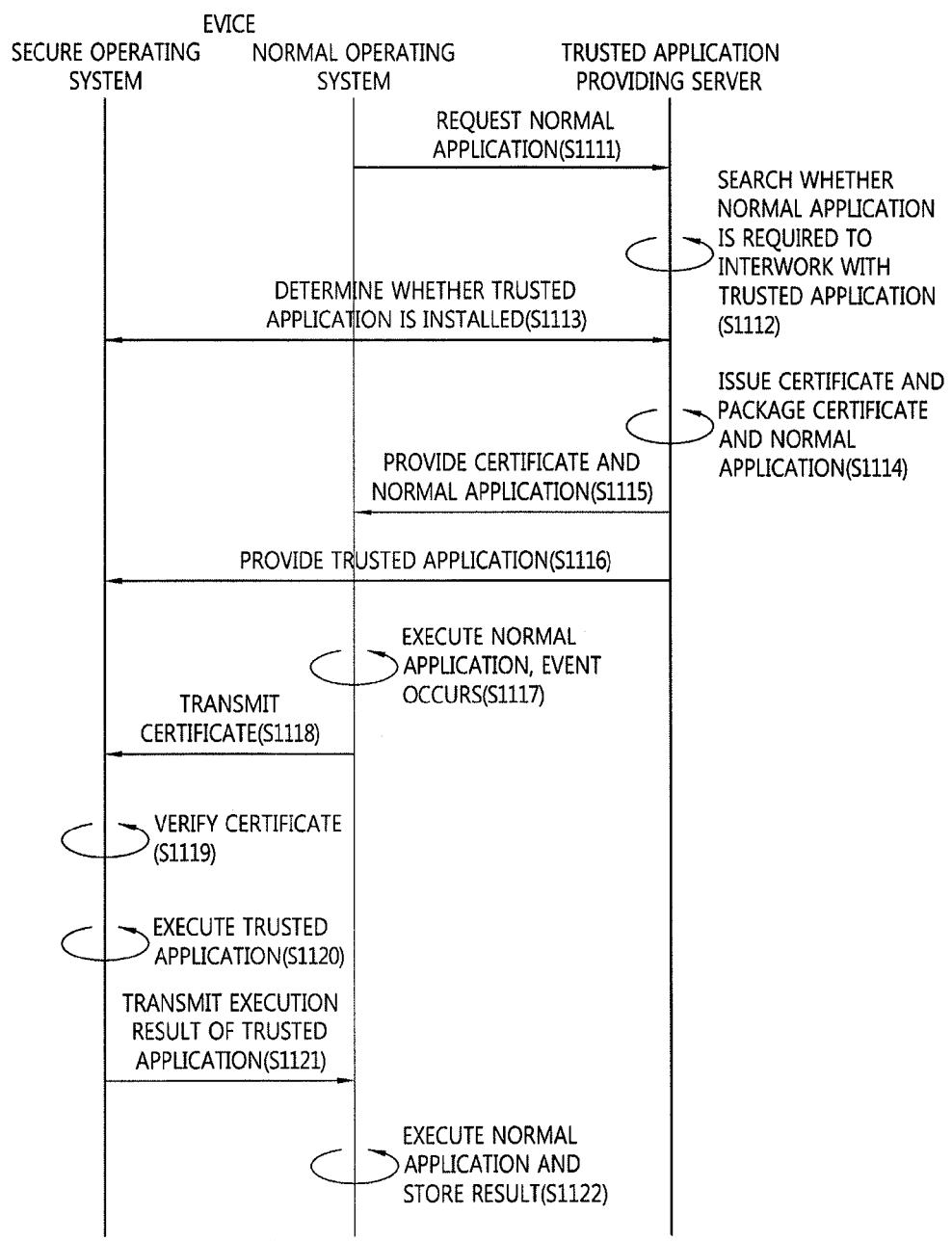
FIG. 11 is a diagram showing a method for interworking between a secure domain and a normal domain in accordance with a still further aspect of the present invention.

FIG. 11 is a diagram showing a method for interworking between a secure domain and a normal domain in accordance with a still further aspect of the present invention.

As shown in FIG. 11, a method for interworking between a secure domain and a normal domain issues a certificate having the authority to invoke a trusted application when a normal application is requested, invokes the trusted application during the execution of the normal application using the certificate, and allows the applications stored in the normal domain and the secure domain, respectively, to interwork with each other, thus processing some procedures.

Steps S1111 to S1116 correspond to the steps of FIG. 9, in which the certificate having the authority to invoke a trusted application is issued, when the normal application is provided, and packaged with the normal application and provided to the device.

Steps S1117 to S1122 correspond to the steps of FIG. 10, in which when the executed normal application is required to interwork with the trusted application, the normal application of the normal domain interworks with the trusted application of the secure domain.

Recording Medium Recording Method for Interworking Between Secure Domain and Normal Domain as Program and Readable by Electronic Device According to still another aspect of the present invention, a recording medium recording a method for interworking between a secure domain and a normal domain as a program and readable by an electronic device may be provided, the method for interworking between the secure domain and the normal domain comprising the steps of: requesting, at a device equipped with a trusted platform, a normal application from an application providing server; searching, at the application providing server, whether the requested normal application is required to interwork with a trusted application; determining whether a trusted application capable of interworking with the normal application is installed in the device when the normal application is required to interwork with the trusted application; issuing, at the application providing server, a certificate by matching an authority to invoke the trusted application installed in the device with the normal application when the trusted application is installed in the device and packaging the issued certificate and the normal application; and providing, at the application providing server, the packaged certificate and normal application to the device when the trusted application is installed in the device.

According to another aspect of the present invention, a recording medium recording a method for interworking between a secure domain and a normal domain as a program and readable by an electronic device may be provided, the method for interworking between the secure domain and the normal domain comprising the steps of: requesting, at a device equipped with a trusted platform, a normal application from an application providing server; searching, at the application providing server, whether the requested normal application is required to interwork with a trusted application; determining whether a trusted application capable of interworking with the normal application is installed in the device when the normal application is required to interwork with the trusted application; issuing, at the application providing server, a certificate by matching the authority to invoke the trusted application capable of interworking with the normal application with the normal application when the trusted application is not installed in the device and packaging the issued certificate and the normal application; and providing, at the application providing server, the packaged certificate and normal application and the trusted application capable of interworking with the normal application to the device when the trusted application is not installed in the device.

The method for interworking between the secure domain and the normal domain can be written as a program, and the codes and code segments that constitute the program can be easily construed by programmers skilled in the art to which the present invention pertains.

Moreover, the program of the method for interworking between the secure domain and the normal domain can be stored in an electronic device-readable medium and read and executed by the electronic device, and thus it is possible to interwork between the applications of the normal domain and the secure domain such that some procedures can be executed in the secure domain by invoking the trusted application during the execution of the normal application stored in the normal domain.

Accordingly, the certificate having the authority to invoke the trusted application is provided together with the normal application, and thus the procedures of the secure domain required during the execution of the application installed in the normal domain can be executed.

Figure 12:
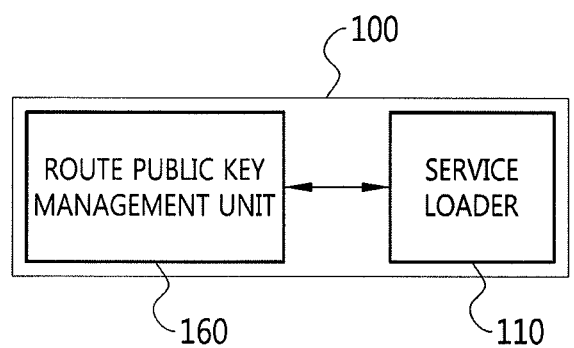
FIG. 12 is a configuration diagram showing an embodiment of a trusted application download management server of a key management system for an update of a route public key in accordance with a yet further aspect of the present invention.

Trusted Application Download Management Server of Key Management System for an Update of Route Public Key FIG. 12 is a configuration diagram showing an embodiment of a trusted application download management server of a key management system for an update of a route public key in accordance with a yet further aspect of the present invention.

According to this embodiment, as shown in FIG. 12, a trusted application download management server 100 of a key management system for an update of a route public key comprises a route public key management unit 160 and a service loader 110. The route public key management unit 160 is the same element as the key management unit 160 of FIG. 1 and will be defined as the "route public key management unit" by specifying the features of the present invention.

The trusted application download management server 100 receives a download authority for a trusted application from a trusted application providing server and provides the trusted application directly to a device equipped with a trusted platform (hereinafter referred to as a "device") or serves as a gateway through which the trusted application providing server provides the trusted application to the device.

The route public key management unit 160 of the trusted application download management server 100 manages route public keys of the trusted application providing server and the trusted application download management server, which are required to perform an authentication procedure during the installation of the trusted application in the device.

That is, the route public key management unit 160 generates a first route public key of the trusted application provided server and a second route public key of the trusted application download management server.

When the first route public key or the second route public key is updated, the route public key management unit 160 manages update information and the updated route public key and provides the update information or the updated route public key to the trusted application providing server or the device.

The route public key management unit 160 transmits the generated first route public key to the trusted application providing server, and the service loader 110 receives a trusted application, to which a first certificate generated by encrypting the first route public key is added, from the trusted application providing server. Moreover, the route public key management unit 160 of the trusted application download management server 100 generates a second certificate by encrypting the second route public key.

When the update of the first route public key or the second route public key is inquired by the device, the route public key management unit 160 may transmit the stored update information and the updated route public key to the device.

When the update of the first route public key is inquired by the trusted application providing server, the route public key management unit 160 may transmit the stored update information and the updated route public key to the trusted application providing server.

The service loader 110 accesses the device and the trusted application providing server to establish a data communication channel, transmits necessary data, and terminates the session when the data communication is completed.

When receiving the trusted application, to which the first certificate is added, from the trusted application providing server, the service loader 110 further adds the second certificate to the trusted application, and transmits them to the device.

Here, the first certificate is generated for the trusted application authentication by encrypting the first route public key by the trusted application providing server, and the second certificate is generated for the trusted application authentication by the trusted application download management server.

Figure 13:
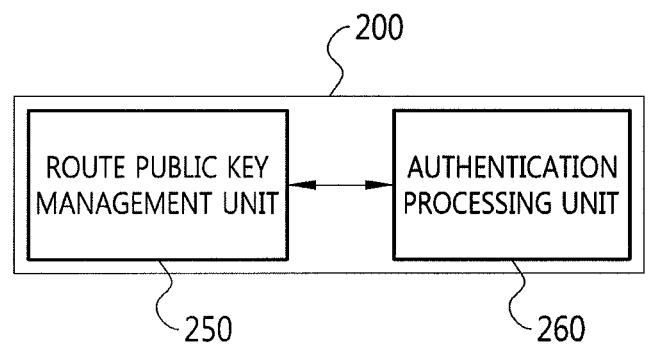
FIG. 13 is a configuration diagram showing an embodiment of a device equipped with a trusted platform of a key management system for an update of a route public key in accordance with a still yet further aspect of the present invention.

Device Equipped with Trusted Platform of Key Management System for an Update of Route Public Key FIG. 13 is a configuration diagram showing an embodiment of a device equipped with a trusted platform of a key management system for an update of a route public key in accordance with a still yet further aspect of the present invention.

According to this embodiment, as shown in FIG. 13, a device 200 equipped with a trusted platform of a key management system for an update of a route public key comprises a route public key management unit 250 and an authentication processing unit 260.

The route public key management unit 250 stores a first route public key and a second route public key received from a trusted application download management server, inquires of the trusted application download management server about the update of the route public key, and manages update information.

In detail, the route public key management unit 250 inquires of the trusted application download management server about the update of the first route public key or the second route public key and receives and stores the update information and the updated route public key.

The device 200 needs not to inquire of the trusted application download management server or the trusted application providing server about the update of the route public key of each server and may inquire of the trusted application download management server, which totally manages the route public keys, about the update of each route public key.

The authentication processing unit 260 may perform authentication for installation of the trusted application using the first route public key and the second route public key.

The authentication processing unit 260 may perform the authentication of a root protection domain using the second route public key and then, when the authentication of the root protection domain succeeds, perform the authentication of a protection domain using the first route public key.

Key Management System for an Update of Route Public Key

According to this embodiment, as shown in FIG. 4, a key management system for an update of a route public key may comprise trusted application providing servers 300a and 300b, a trusted application download management server 100, and a device 200 equipped with a trusted platform.

The trusted application download management server 100 generates a first route public key and a second route public key and manages update information of the first route public key and the second route public key.

Moreover, the trusted application download management server 100 generates a second certificate by encrypting a generated or updated second route public key, further adds the second certificate to a trusted application, to which a first certificate is added, and then transmits them to the device 200.

The trusted application providing servers 300a and 300b receives the first route public key from the trusted application download management server 100, generates the first certificate using the first route public key, adds the first certificate to the trusted application, and transmits them to the trusted application download management server 100.

Moreover, when receiving the update information of the first route public key and the updated route public key from the trusted application download management server 100, the trusted application providing servers 300a and 300b generates the first certificate by encrypting the updated first route public key.

The device 200 receives the first route public key and the second route public key from the trusted application download management server 100 and performs the authentication for the installation of the trusted application. Moreover, when the first route public key or the second route public key is updated by the trusted application download management server 100, the device 200 receives the update information and the updated route public key and uses them in the authentication procedure.

The trusted application download management server 100 manages both the route public keys of the trusted application providing servers 300a and 300b and the trusted application download management server 100, and thus it is possible to effectively manage the update information of the route public keys.

Key Management Method for an Update of Route Public Key

Figure 14:
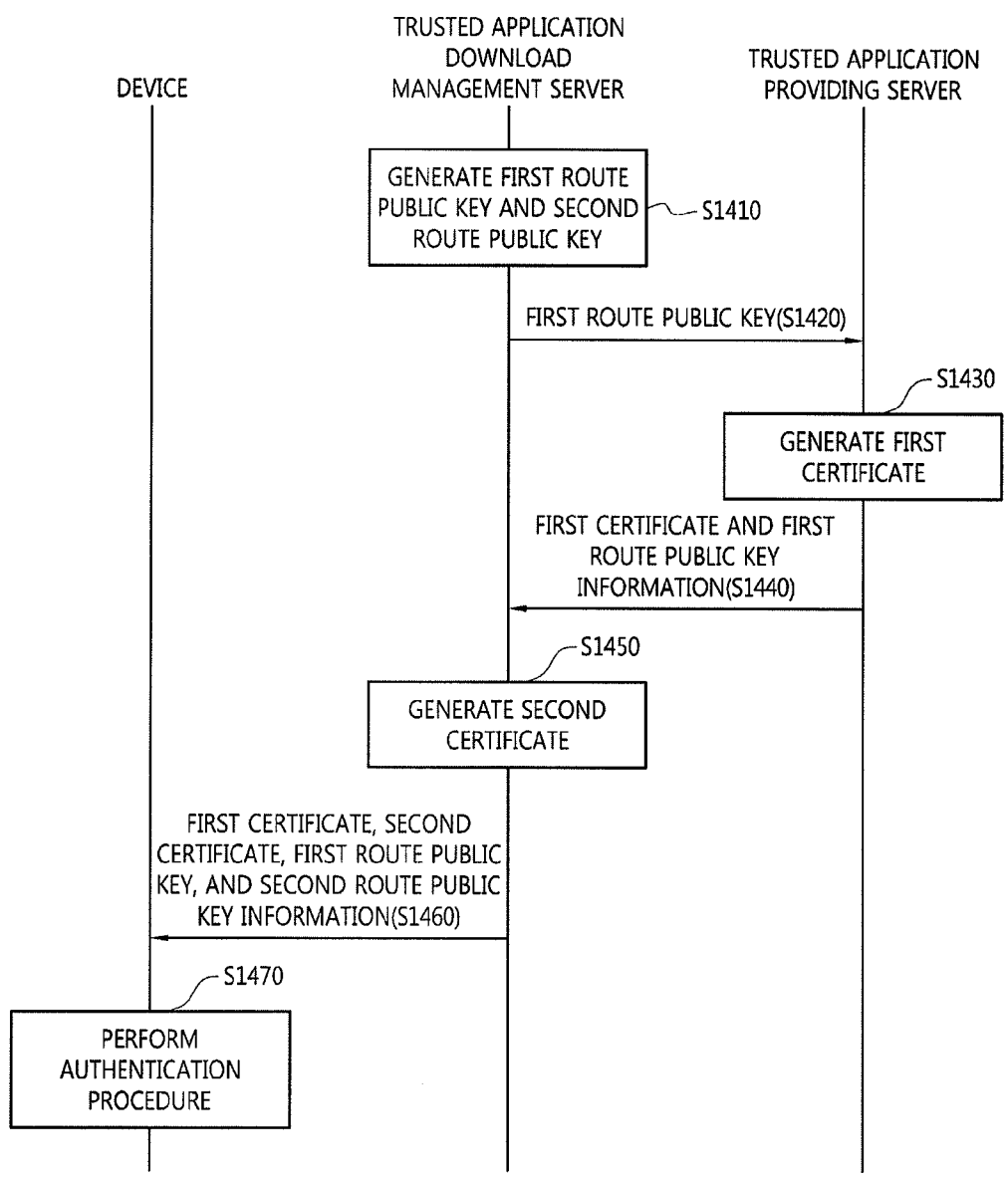
FIG. 14 is a flowchart showing an embodiment of a key management method for an update of a route public key in accordance with an additional aspect of the present invention.
Figure 15:
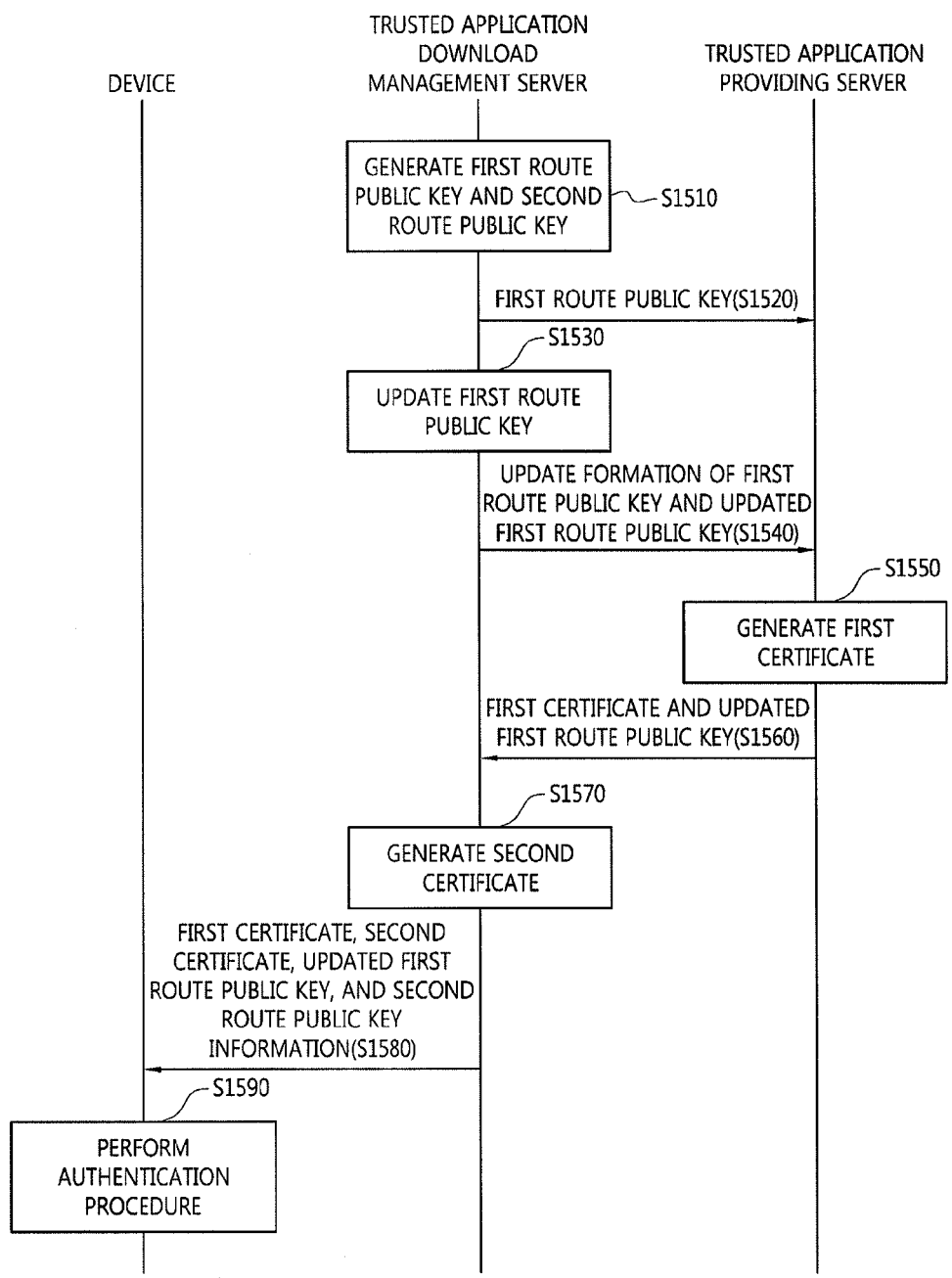
FIG. 15 is a flowchart showing another embodiment of a key management method for an update of a route public key in accordance with a still additional aspect of the present invention.

FIG. 14 is a flowchart showing an embodiment of a key management method for an update of a route public key in accordance with an additional aspect of the present invention, and FIG. 15 is a flowchart showing another embodiment of a key management method for an update of a route public key in accordance with a still additional aspect of the present invention.

Example 1

As shown in FIG. 14, according to a key management method for an update of a route public key in accordance with Example 1, first and second route public keys are generated by a trusted application download management server and transmitted to a trusted application providing server or a device.

In the key management method for the update of the route public key, a first route public key and a second route public key are generated by the trusted application download management server (S1410), and the generated first route public key is transmitted to the trusted application providing server (S1420).

The trusted application providing server generates a first certificate by encrypting the received first route public key (S1430) and transmits the first certificate added to a trusted application and information of the first route public key to the trusted application download management server (S1440).

The trusted application download management server generates a second certificate by encrypting the second route public key (S1450), adds the second certificate to the trusted application to which the first certificate is added, and transmits the second certificate together with the first route public key and information of the second route public key to the device (S1460).

The device performs an authentication procedure by decrypting the first certificate and the second certificate using the received first route public key and information of the second route public key (S1470).

Example 2

As shown in FIG. 15, according to a key management method for an update of a route public key in accordance with Example 2, first and second route public keys are generated by a trusted application download management server and transmitted to a trusted application providing server or a device when the first route public key or the second route public key is updated.

In the key management method for the update of the route public key, a first route public key and a second route public key are generated by the trusted application download management server (S1510), and the generated first route public key is transmitted to the trusted application providing server (S1520).

When the first route public key is updated by the trusted application download management server (S1530), update formation of the first route public key and the updated first route public key are transmitted to the trusted application providing server (S1540), and the trusted application providing server generates a first certificate by encrypting the updated first route public key (S1550).

The generated first certificate is transmitted together with a trusted application and information of the updated first route public key to the trusted application download management server (S1560), and then the trusted application download management server generates a second certificate by encrypting the second route public key (S1570) and transmits the first certificate, the second certificate, the trusted application, the information of the updated first route public key, and the information of the second route public key to the device (S1580).

The device may perform an authentication procedure by decrypting the information of the updated first route public key and the information of the second route public key (S1590).

The trusted application download management server can totally manage the first route public key or the second route public key and, when the route public key is updated, can provide the update information and the updated route public key immediately to the trusted application proving server or the device, and thus it is possible to solve the problems caused when the server and the device have different public keys for the update of the public key.

Moreover, the trusted application providing serer of the key management server for the update of the route public key can inquire of the trusted application download management server about the update of the first route public key and, when the first route public key is updated, can transmit the updated first route public key to the trusted application providing server and the device.

Furthermore, when the second route public key is updated, the trusted application download management server can generate the second certificate by encrypting the updated second route public key and can transmit the update information and the updated second route public key to the device, and thus the device can receive the updated second route public key and perform the authentication procedure.

Thus, the trusted application download management server can totally manage the (route) public keys, and thus it is possible to solve the problem of the mismatch of the public keys between the server and the device and totally manage the update information of the public keys.

INDUSTRIAL APPLICABILITY

As described above, the prevent invention is applicable to the recording medium recording an application program, the device executing an application program, the trusted application download management server, the device, and the management system in the field where the trusted application download is managed in the secure domain.

Moreover, the present invention is applicable to the recording medium recording an application program, the device executing an application program, and the trusted application download management server and the device equipped with a trusted platform, which are employed for interworking between the secure domain and the normal domain in the field where the interworking between the secure domain and the normal domain is processed.

Furthermore, the present invention is applicable to the key management system, and the trusted application download management server, the trusted application providing server, and the device equipped with a trusted platform, which constitute the key management system in the field where the key management method for the update of the route public key is processed.

The invention claimed is:

1. A method for interworking between a secure domain and a normal domain, the method comprising the steps of:
   (a) requesting, by a device equipped with a trusted platform, a normal application from an application providing server;
   (b) searching, by the application providing server, whether the requested normal application is required to interwork with a trusted application;
   (c) when the normal application is required to interwork with the trusted application, determining whether a trusted application capable of interworking with the normal application is installed in the device;
   (d) when the trusted application capable of interworking with the normal application is installed in the device, issuing, by the application providing server, a certificate by matching an authority to invoke the installed trusted application with the normal application, and packaging the issued certificate and the normal application; and
   (e) providing, by the application providing server, the packaged certificate and normal application to the device when the trusted application is installed in the device.

2. A method for interworking between a secure domain and a normal domain, the method comprising the steps of:
   (a) requesting, by a device equipped with a trusted platform, a normal application from an application providing server;
   (b) searching, by the application providing server, whether the requested normal application is required to interwork with a trusted application;
   (c) when the normal application is required to interwork with the trusted application, determining whether a trusted application capable of interworking with the normal application is installed in the device;
   (d) when the trusted application is not installed in the device, issuing, by the application providing server, a certificate by matching an authority to invoke the trusted application capable of interworking with the normal application with the normal application, and packaging the issued certificate and the normal application; and
   (e) providing, by the application providing server, the packaged certificate and normal application and the trusted application capable of interworking with the normal application to the device when the trusted application is not installed in the device.

3. The method of claim 1, further comprising, after step (e), the step of:
   (f) installing, by the device, the normal application in the normal domain of the device.

4. The method of claim 2, further comprising, after step (e), the step of:
   (f) installing, by the device, the normal application in the normal domain of the device and the trusted application in the secure domain of the device.

5. The method of claim 3, further comprising, after step (f), the steps of:
- (g) when an event that requires the execution of the installed trusted application occurs as the installed normal application is executed, transmitting, by an operating system of the normal domain, the packaged certificate to an operating system of the secure domain;
- (h) verifying, by the operating system of the secure domain, whether the packaged certificate has the authority to invoke the installed trusted application;
- (i) when the verification succeeds, executing the installed trusted application; and
- (j) transmitting, by the operating system of the secure domain, the execution result of the trusted application to the operating system of the normal domain.

6. The method of claim 3, further comprising, after step (f), the steps of:
- (g) when an event that requires the execution of the installed trusted application occurs as the installed normal application is executed, transmitting, by an operating system of the normal domain, the packaged certificate to an operating system of the secure domain;
- (h) verifying, by the operating system of the secure domain, whether the packaged certificate has the authority to invoke the installed trusted application; and
- (i) when the verification fails, notifying, by the operating system of the secure domain, the operating system of the normal domain that the installed trusted application is not accessible.

7. A non-transitory recording medium recording a program which, when executed by an application providing server, causes the application providing server to perform a method for interworking between a secure domain and a normal domain, wherein the method comprises the steps:

receiving, by the application providing server, a request for a normal application from a device equipped with a trusted platform;

searching, by the application providing server, whether the requested normal application is required to interwork with a trusted application;

when the normal application is required to interwork with the trusted application, determining, by the application providing server, whether a trusted application capable of interworking with the normal application is installed in the device when the trusted application capable of interworking with the normal application is installed in the device, issuing, by the application providing server, a certificate by matching an authority to invoke the installed trusted application with the normal application, and packaging the issued certificate and the normal application; and providing, by the application providing server, the packaged certificate and normal application to the device when the trusted application is installed in the device.

8. A non-transitory recording medium recording a program which, when executed by an application providing server, causes the application providing server to perform a method for interworking between a secure domain and a normal domain, wherein the method comprises the steps:

receiving, by the application providing server, a request for a normal application from a device equipped with a trusted platform;

searching, by the application providing server, whether the requested normal application is required to interwork with a trusted application;

when the normal application is required to interwork with the trusted application, determining, by the application providing server, whether a trusted application capable of interworking with the normal application is installed in the device;

when the trusted application is not installed in the device, issuing, by the application providing server, a certificate by matching the authority to invoke the trusted application capable of interworking with the normal application with the normal application, and packaging the issued certificate and the normal application; and providing, by the application providing server, the packaged certificate and normal application and the trusted application capable of interworking with the normal application to the device when the trusted application is not installed in the device.

9. An application providing server, comprising:

an application characteristic searcher configure to, when a normal application request message for a normal application is received from a device equipped with a trusted platform, search whether the normal application is required to interwork with a trusted application according to an execution of the normal application;

a certificate issuer configured to issue a certificate by matching an authority to invoke the trusted application with the normal application;

an application storage configured to package the issued certificate and the normal application, and store the trusted application, the packaged certificate and normal application together; and a transmitter/receptor configured to receive the normal application request message from the device, and provide the packaged certificate and normal application or the trusted application to the device.

* * * * *